United States Patent [19]

Pipkin

[11] Patent Number: 4,670,025
[45] Date of Patent: Jun. 2, 1987

[54] THERMALLY STABLE DIAMOND COMPACTS

[76] Inventor: Noel J. Pipkin, 138/140 Pritchard Street, Johannesburg North, Randburg, Transvaal, South Africa

[21] Appl. No.: 763,806

[22] Filed: Aug. 8, 1985

[30] Foreign Application Priority Data

Aug. 13, 1984 [ZA] South Africa ............. 84/6272

[51] Int. Cl.$^4$ ............................................. B24D 11/00
[52] U.S. Cl. ......................................... 51/295; 51/309
[58] Field of Search ................ 51/295, 309; 428/545

[56] References Cited

U.S. PATENT DOCUMENTS

| 4,063,909 | 12/1977 | Mitchell | 51/295 |
| 4,156,329 | 5/1979 | Daniels et al. | 51/295 |
| 4,184,853 | 1/1980 | Otopkov et al. | 51/295 |
| 4,224,380 | 9/1980 | Bovenkerk et al. | 51/309 |
| 4,225,322 | 9/1980 | Knemeyer | 51/295 |
| 4,228,942 | 10/1980 | Dietrich | 51/309 |
| 4,527,998 | 7/1985 | Knemeyer | 51/309 |
| 4,534,773 | 8/1985 | Phaal et al. | 51/308 |

FOREIGN PATENT DOCUMENTS 0104063 3/1984 European Pat. Off. .

Primary Examiner—Paul Lieberman
Assistant Examiner—Willie J. Thompson
Attorney, Agent, or Firm—Curtis, Morris & Safford

[57] ABSTRACT

A thermally stable diamond compact which has an alloy of liquidus above 700° C. bonded to a surface thereof. The alloy contains at least 40 percent by weight of silver or gold or a combination thereof and 1 to 10 percent by weight of an active metal selected from the group of tungsten, titanium, zirconium, hafnium, vanadium, niobium, tantalum, chromium and molybdenum and having a liquidus temperature above 700° C.

14 Claims, No Drawings

THERMALLY STABLE DIAMOND COMPACTS

BACKGROUND TO THE INVENTION

This invention relates to thermally stable diamond compacts.

Abrasive compacts are well known in the art and are used extensively in industry for the abrading of various workpieces. They consist essentially of a mass of abrasive particles present in an amount of at least 70%, preferably 80 to 90%, by volume of the compact bonded into a hard conglomerate. Compacts are polycrystalline masses and can replace single large crystals. The abrasive particles of compacts are invariably ultra hard abrasives such as diamond and cubic boron nitride.

Abrasive compacts may contain a second phase or bonding matrix which contains a solvent (also known as a catalyst) useful in synthesising the particles. In the case of diamond, examples of suitable solvents are metals of group VIII of the periodic table such as cobalt, nickel or iron or an alloy containing such a metal. The presence of these solvents in diamond compacts renders them thermally sensitive at temperatures above 700° C. In other words, at temperatures above 700° C. degradation of the diamond is likely to occur. This, together with the differences in coefficients of thermal expansion of the diamond and solvent, causes structural degradation of the compact. The result is that the compact is substantially weakened or rendered useless as an abrasive.

U.S. Pat. No. 4,224,380 describes a method of leaching out a substantial quantity of solvent from a diamond compact. The resulting product is therefore substantially free of catalyst and is thermally more stable than the unleached product. Such a compact has an ability to withstand temperatures of up to 1200° C. under vacuum without significant structural degradation of the compact occurring. The compact is known as a thermally stable compact.

Other thermally stable diamond compacts have been described in the literature and used commercially. For example European Patent Publication No. 0 116 403 describes a thermally stable diamond compact comprising a mass of diamond particles present in an amount of 80 to 90% by volume of the body and a second phase present in an amount of 10 to 20% by volume of the body, the mass of diamond particles containing substantial diamond-to-diamond bonding to form a coherent skeletal mass and the second phase containing nickel and silicon, the nickel being in the form of nickel and/or nickel silicide and the silicon being in the form of silicon, silicon carbide, and/or nickel silicide.

A further example of a thermally stable diamond compact is that described in the specification of British Patent Application No. 8508295. The thermally stable diamond compact comprises a mass of diamond particles present in an amount of 80 to 90 percent by volume of the compact and a second phase present in an amount of 10 to 20 percent by volume of the insert, the mass of diamond particles containing substantial diamond-to-diamond bonding to form a coherent skeletal mass and the second phase consisting essentially of silicon, the silicon being in the form of silicon and/or silicon carbide.

European Patent Publication No. 0 104 063 describes a method of bonding a cubic boron nitride compact to a cemented carbide support. The method includes the steps of metallising a surface of the cubic boron nitride compact by bonding a layer of gold, silver or a gold or silver-based alloy to that surface and bonding the metallised surface to a surface of the cemented carbide support through a braze alloy having a liquidus temperature above 700° C. The preferred braze alloy contains at least 40 percent by weight silver, gold or a combination thereof, and 1 to 10 percent by weight of an active metal selected from the group of titanium, zirconium, hafnium, vanadium, niobium, tantalum, chromium and molybdenum. The disclosure of the specification is specifically limited to the bonding of a cubic boron nitride compact to a cemented carbide support.

The disclosures of the four specifications mentioned above are incorporated herein by reference.

SUMMARY OF THE INVENTION

According to the present invention, there is provided a polycrystalline mass of diamond particles present in an amount of at least 70 percent by volume bonded into a hard conglomerate and being able to withstand a temperature of 1200° C. in a vacuum without any significant structural degradation of the compact occurring, the compact having bonded to a surface thereof an alloy layer, the alloy containing at least 40 percent by weight of silver or gold or a combination thereof and 1 to 10 percent by weight of an active metal selected from the group of tungsten, titanium, zirconium, hafnium, vanadium, niobium, tantalum, chromium and molybdenum and having a liquidus temperature above 700° C.

The diamond compact is thus a thermally stable diamond compact, examples of which are described in the specifications above and are well known in the art. These compacts are capable of withstanding a temperature of 1200° C. in a vacuum, for example a vacuum of $10^{-5}$ mbar or better, without any significant structural degradation of the compact occurring. Such compacts find particular application in abrasive tools where high temperatures are generated during use thereof, as for example in dressing or trueing tools, or where high temperatures are required during manufacture of the tool, as for example in surface set or impregnated drill bits.

DETAILED DESCRIPTION OF THE INVENTION

As mentioned above, thermally stable diamond compacts are used in applications where high temperatures are generated in use or during manufacture of the tool. Such compacts are not easily wetted by conventional brazes and this is one of the reasons why they are as a general rule held mechanically in the working surface of the tool. For example, in a surface set drill bit the individual compacts, which may have a triangular, cubic, hexagonal or other useful shape, will be held mechanically in the matrix of the working surface of the drill bit. It is desirable to supplement the mechanical bond by a bond of a chemical or braze nature.

It has been found that the alloy specified above bonds extremely strongly to the diamond compact surface to which it is applied. Furthermore, the alloy, it has been found, bonds readily to a variety of commercially available brazes and forms a braze bond with the matrix of conventional surface set and impregnated drill bits.

The alloy coated surface may be bonded readily to a cemented carbide support, either directly or through another commercially available braze. When another commercially available braze is used, it is preferably a high temperature braze such as a silver/copper/zinc/nickel/manganese braze or a copper/manganese/nickel/indium/tin braze both of which have a liquidus temperature above 700° C. The diamond compact, being thermally stable, can withstand such temperatures and the resulting braze bond is extremely strong. The invention thus enables a thermally stable diamond compact to be brazed to a tool or tool holder in contrast to uncoated thermally stable diamond compacts of the prior art.

The alloy will preferably contain 40 to 70 percent by weight of gold or silver or a combination thereof. Examples of suitable alloys are the following:
1. Gold and the active metal.
2. A silver/copper binary alloy containing the active metal.
3. A silver/copper/palladium ternary alloy containing the active metal, particularly titanium.

The thickness of the alloy layer is not critical, but it will generally not exceed 200 microns in thickness.

The thermally stable diamond compact may be used in the form of small fragments having any one of a number of useful shapes such as cube, triangle or hexagon. For such compacts it is preferable that the alloy layer is bonded to at least 75 percent of the surface thereof.

The thermally stable diamond compact may also be provided in the form of a disc or segment of a disc having a major flat surface on each of opposite sides thereof. For such compacts it is preferable that at least one of the major flat surfaces has the alloy layer bonded to it. The coated flat surface may be bonded to a cemented carbide support.

The alloy may be bonded to the surface of the diamond compact by contacting the surface with the alloy, for example in the form of a foil, and then raising the temperature of the coated compact to a temperature above the liquidus temperature of the alloy in a non-oxidising atmosphere. An example of a suitable non-oxidising atmosphere is a vacuum of $10^{-4}$ mbar or better. To improve the wettability of the diamond compact surface, it is preferable first to apply a flashing of gold or silver to the compact surface before the alloy is bonded thereto. The gold or silver flashing will generally have a thickness of no more than a few microns. A method of applying a gold or silver flashing prior to bonding the alloy to the surface is described fully in European Patent Publication No. 0 104 063.

The thermally stable diamond compact may be any known in the art, but is preferably one of the type described in British Patent Application No. 8508295.

The invention will further be described with reference to the following examples.

EXAMPLE 1

A diamond compact in disc form was produced using the method described in British Patent Application No. 8508295. The compact consisted of a mass of diamond particles containing a substantial amount of direct diamond-to-diamond bonding to form a coherent skeletal mass and a second phase consisting essentially of silicon in the form of elemental silicon and silicon carbide. The compact was a thermally stable diamond compact as discussed hereinbefore.

A major flat surface of the diamond compact was degreased in alcohol. A 100 micron thick foil of a silver based alloy was placed on the degreased and etched surface of the diamond compact. The silver-based alloy contained 62% silver, 19% copper, 14% palladium and 5% titanium, all percentages being by weight. A cemented tungsten carbide disc was placed on the alloy foil to produce an unbonded stack. A load of 50 to 100 gms was applied to the unbonded stack. The loaded stack was then heated in a vacuum of better than $10^{-4}$ mbar to 1100° C. and maintained at this temperature for 10 minutes. The stack was allowed to cool to ambient temperature. It was found that an excellent bond between the thermally stable diamond compact and the cemented carbide disc was obtained.

A similar bonded compact was produced using the same procedure, save that a flashing (0,1 mm thick) of gold was applied to the compact surface after degreasing. Again excellent bonding between compact and cemented carbide disc was obtained.

EXAMPLE 2

A thermally stable diamond compact as described in Example 1 had a major flat surface degreased in alcohol. To this degreased and etched surface was applied a 100 micron thick foil of the same silver/copper/palladium/titanium alloy. The compact and foil were heated to 1100° C. in a vacuum of better than $10^{-4}$ mbar and held at this temperature for 5 minutes. The compact was cooled to ambient temperature. The alloy was found to bond strongly to the diamond compact producing a metallised surface.

The metallised compact was positioned on the top of a cemented tungsten carbide disc with the metallised surface face down. Between the metallised surface and the cemented carbide disc was placed a 100 micron thick disc of Nicuman-36 alloy (56Cu-36Mn-2Ni-3In-3Sn) having a melting range of 771° to 825° C. A load of about 50 to 100 gms was applied to the compact/carbide unbonded stack.

The stack was heated to 1000° C. in a vacuum of better than $10^{-4}$ mbar and held at this temperature for 10 minutes. The stack was allowed to cool to ambient temperature.

It was found that the diamond compact was strongly bonded to the cemented carbide disc.

EXAMPLE 3

A thermally stable diamond compact as described in Example 1 was fragmented into a plurality of cubes. The cubes were degreased in alcohol. The clean surfaces of the cubes then had applied to them a flashing, approximately 0,1 microns in thickness, of gold using standard sputtercoating techniques.

All but one surface of each cube was then wrapped in a foil of an alloy as described in Example 1. The wrapped cubes were heated to a temperature of 1100° C. in a vacuum of $10^{-4}$ mbar. This caused the alloy to melt and bond firmly to each cube. The gold flashing assisted in wetting the surfaces of the cubes and assisting in the bonding of the alloy to these surfaces. The alloy was found to be very firmly bonded to the cubes exhibiting a shear strength in excess of 15 kgmm$^{-2}$.

I claim:

1. A diamond compact comprising a polycrystalline mass of diamond particles present in an amount of at least 70 percent by volume bonded into a hard conglomerate and being able to withstand a temperature of 1200° C. in a vacuum without any significant structural degradation of the compact occurring, the compact having bonded to a surface thereof an alloy layer, the alloy containing at least 40 percent by weight of silver or gold or a combination thereof and 1 to 10 percent by weight of an active metal selected from the group consisting of tungsten, titanium, zirconium, hafnium, vanadium, niobium, tantalum, chromium and molybdenum and having a liquidus temperature above 700° C.

2. A diamond compact according to claim 1 wherein the alloy contains 40 to 70 percent by weight of silver or gold or a combination thereof.

3. A diamond compact according to claim 1 wherein the alloy contains silver, copper, palladium and titanium.

4. A diamond compact according to claim 1 wherein the alloy layer does not exceed 200 microns in thickness.

5. A diamond compact according to claim 1 wherein the alloy layer is bonded to at least 75 percent of the surface thereof.

6. A diamond compact according to claim 5 which has a cubic, triangular or hexagonal shape.

7. A diamond compact according to claim 1 wherein the compact has the form of a disc or segment of a disc having a major flat surface on each of opposite sides thereof, at least one of the major flat surfaces having the alloy layer bonded to it.

8. A diamond compact according to claim 7 wherein a cemented carbide support is bonded to a major flat surface thereof through the alloy layer.

9. A diamond compact according to claim 1 wherein the polycrystalline mass of diamond particles is present in an amount of 80 to 90 percent by volume.

10. A diamond compact which is adapted for bonding to metallic matrix material of a surface set or impregnated drill bit, which compact consists essentially of a polycrystalline mass of diamond particles present in an amount of at least 70 percent by volume bonded into a hard conglomerate and being able to withstand a temperature of 1200° C. in a vacuum without any significant structural degradation of the compact occurring, the compact having bonded to a surface thereof an alloy layer, the alloy containing at least 40 percent by weight of silver or gold or a combination thereof and 1 to 10 percent by weight of an active metal selected from the group consisting of tungsten, titanium, zirconium, hafnium, vanadium, niobium, tantalum, chromium and molybdenum and having a liquidus temperature above 700° C.

11. A diamond compact adapted for bonding to metallic matrix material of a surface set or impregnated drill bit, which compact consists essentially of a polycrystalline mass of diamond particles present in an amount of at least 70 percent by volume, and a second phase, wherein the polycrystalline mass of diamond particles is bonded into a hard conglomerate able to withstand a temperature of 1200° C. in a vacuum without any significant structural degradation of the compact occurring, the compact having bonded to a surface thereof an alloy layer, the alloy containing at least 40 percent by weight of silver or gold or a combination thereof and 1 to 10 percent by weight of an active metal selected from the group consisting of tungsten, titanium, zirconium, hafnium, vanadium, niobium, tantalum, chromium and molybdenum and having a liquidus temperature above 700° C.

12. A diamond compact according to claim 11, wherein the polycrystalline mass of diamond particles is present in an amount of 80 to 90 percent by volume and the second phase is present in an amount of 10 to 20 percent by volume.

13. A diamond compact according to claim 11, wherein the second phase consists essentially of silicon in the form of elemental silicon and silicon carbide.

14. A diamond compact according to claim 12, wherein the second phase consist essentially of silicon in the form of elemental silicon and silicon carbide.

* * * * *